(12) United States Patent  
Kimura et al.

(10) Patent No.: US 8,043,516 B2  
(45) Date of Patent: *Oct. 25, 2011

(54) METHOD OF MANUFACTURING MAGNETIC RECORDING MEDIUM AND MAGNETIC RECORDING MEDIUM

(75) Inventors: Kaori Kimura, Tokyo (JP); Yoshiyuki Kamata, Tokyo (JP); Satoshi Shirotori, Yokohama (JP); Masatoshi Sakurai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/400,224

(22) Filed: Mar. 9, 2009

(65) Prior Publication Data

US 2009/0162704 A1 Jun. 25, 2009

Related U.S. Application Data

(63) Continuation of application No. PCT/JP2008/061682, filed on Jun. 20, 2008.

(30) Foreign Application Priority Data

Jun. 29, 2007 (JP) ................................ 2007-173047

(51) Int. Cl.  
*B44C 1/22* (2006.01)

(52) U.S. Cl. ............... 216/22; 216/44; 216/45; 216/58; 216/75

(58) Field of Classification Search .................. None  
See application file for complete search history.

(56) References Cited

U.S. PATENT DOCUMENTS

| 4,174,251 | A | * | 11/1979 | Paschke ........................ 438/714 |
| 6,159,862 | A | * | 12/2000 | Yamada et al. ............... 438/712 |
| 6,613,459 | B1 | | 9/2003 | Saito et al. |
| 7,618,549 | B2 | * | 11/2009 | Shirotori et al. ................ 216/22 |
| 2007/0070548 | A1 | * | 3/2007 | Shirotori et al. ............. 360/135 |
| 2007/0217075 | A1 | * | 9/2007 | Kamata et al. ................ 360/135 |
| 2007/0224339 | A1 | * | 9/2007 | Kamata et al. ................ 427/130 |
| 2008/0241595 | A1 | * | 10/2008 | Kimura et al. ................ 428/800 |
| 2009/0081482 | A1 | * | 3/2009 | Kimura et al. ................ 428/810 |
| 2009/0166323 | A1 | * | 7/2009 | Shirotori et al. ................ 216/22 |

FOREIGN PATENT DOCUMENTS

| JP | 02-203412 | 8/1990 |
| JP | 2000-353688 | 12/2000 |
| JP | 2005-235357 | 9/2005 |
| JP | 2006-196143 | 7/2006 |
| JP | 2006-216144 | 8/2006 |
| JP | 2006-236474 | 9/2006 |
| JP | 2006-277868 | 10/2006 |
| JP | 2007-012119 | 1/2007 |

(Continued)

OTHER PUBLICATIONS translation of JP 2007-012119.*

(Continued)

*Primary Examiner* — Duy Deo  
(74) *Attorney, Agent, or Firm* — Pillsbury Winthrop Shaw Pittman, LLP

(57) ABSTRACT

According to one embodiment, a method of manufacturing a magnetic recording medium includes forming protruded magnetic patterns on a substrate, depositing a nonmagnetic material in recesses between the magnetic patterns and on the magnetic patterns, and etching back the nonmagnetic material using an oxygen-containing etching gas while reforming a surface of the nonmagnetic material.

2 Claims, 4 Drawing Sheets

FOREIGN PATENT DOCUMENTS

| | | |
|---|---|---|
| JP | 2007-095116 | 4/2007 |
| JP | 2007-257801 | 10/2007 |
| JP | 2008-034034 | 2/2008 |
| JP | 2008-065944 | 3/2008 |
| JP | 2008-146737 | 6/2008 |

OTHER PUBLICATIONS

International Search Report dated Sep. 22, 2008 for PCT/JP2008/061682.

Japanese Office Action dated Jul. 27, 2010.

* cited by examiner

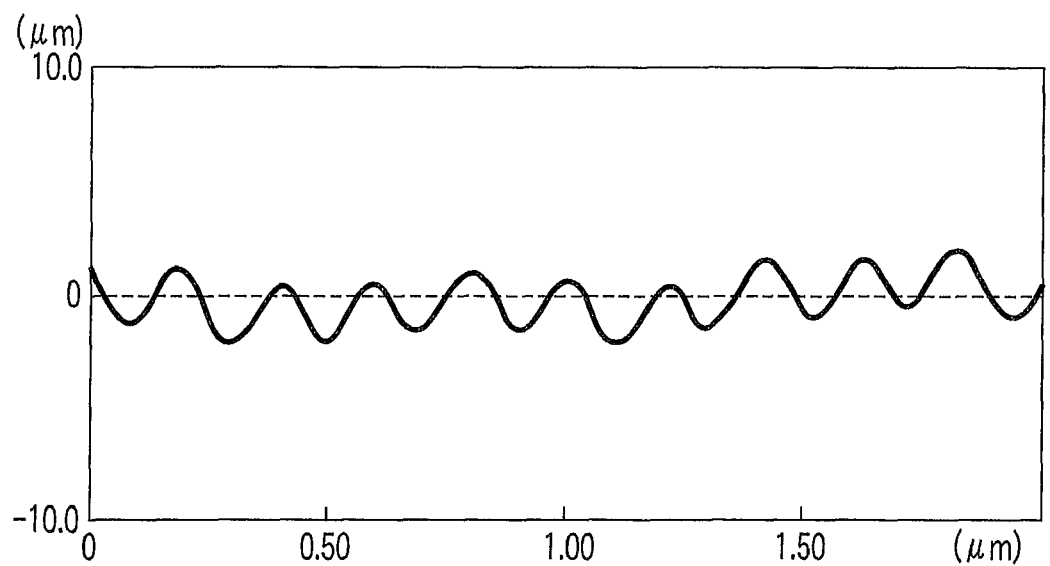
F I G. 4A
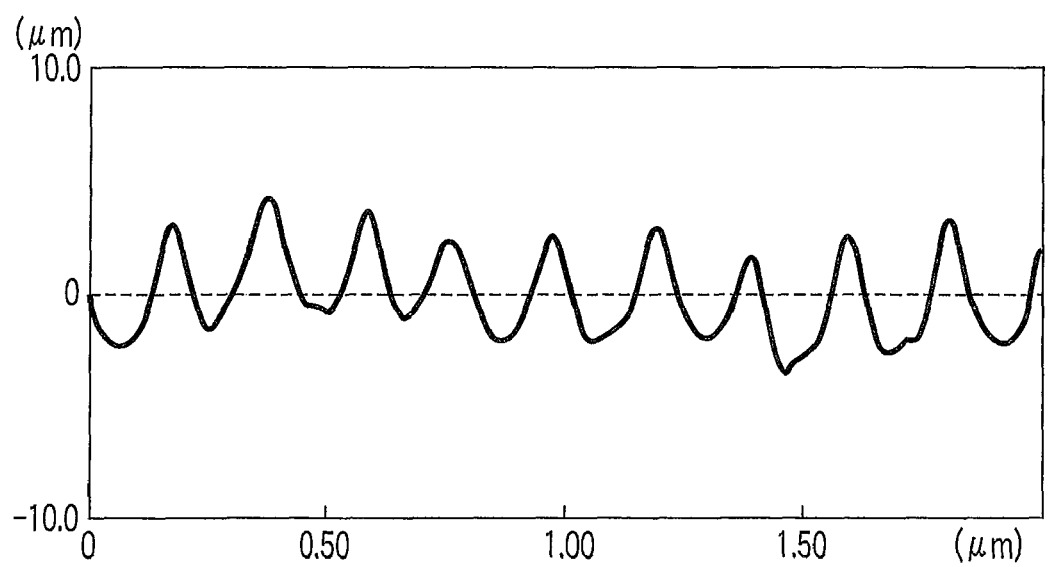
F I G. 4B

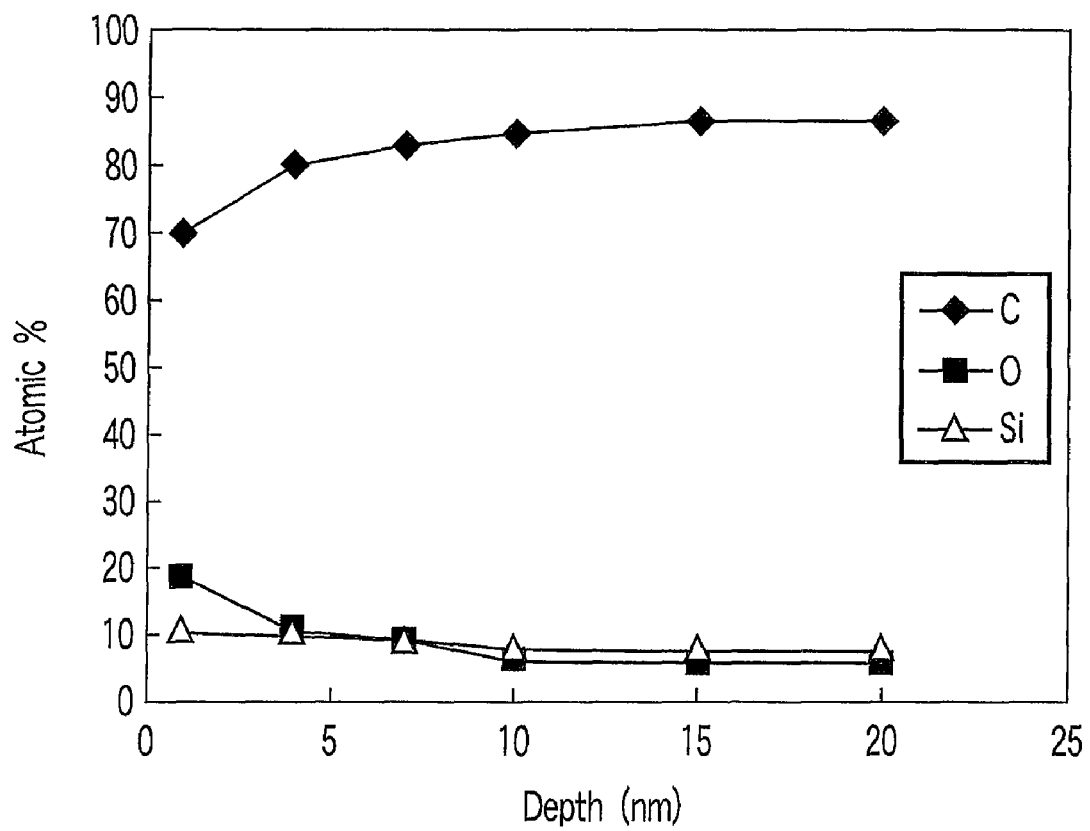
F I G. 5
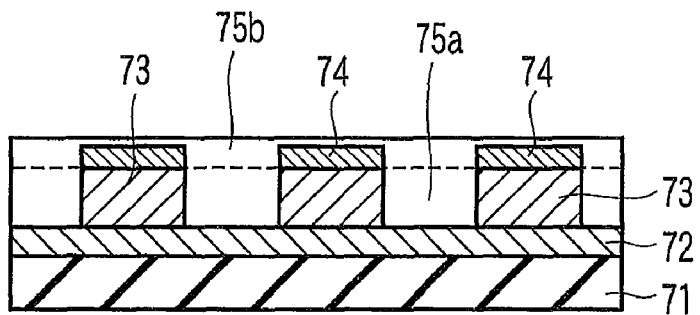
F I G. 6

METHOD OF MANUFACTURING MAGNETIC RECORDING MEDIUM AND MAGNETIC RECORDING MEDIUM

CROSS-REFERENCE TO RELATED APPLICATIONS

This is a Continuation Application of PCT Application No. PCT/JP2008/061682, filed Jun. 20, 2008, which was published under PCT Article 21(2) in English.

This application is based upon and claims the benefit of priority from Japanese Patent Application No. 2007-173047, filed Jun. 29, 2007, the entire contents of which are incorporated herein by reference.

BACKGROUND

1. Field

One embodiment of the present invention relates to a method of manufacturing a magnetic recording medium, in particular a patterned medium, and the magnetic recording medium manufactured by this method.

2. Description of the Related Art

In the information-oriented society in recent years, the amount of information that needs to be stored in a recording medium has been continually increasing. To keep up with the increase in amount of data, there has been a demand for a recording medium and a recording apparatus with a dramatically high recording density. As regards a hard disk for which there is an increasing demand as a high-capacity and inexpensive magnetic recording medium, it is predicted that a recording density of one terabits per square inch or more, which is about ten times higher than the current recording density, will be required several years after.

In an existing magnetic recording medium used in a hard disk, one bit is recorded in a specific region of a thin film made of polycrystals of fine magnetic grains. To raise the recording capacity of the magnetic recording medium, therefore, the recording density must be increased. For this purpose, a recording mark size usable in recording per bit must be reduced. If, however, the recording mark size is simply reduced, effect of recording noise caused by the shape of fine magnetic grains cannot be neglected. Instead, if the fine magnetic grains are further reduced in size, it is impossible to maintain the information recorded in fine magnetic grains at an ordinary temperature due to thermal fluctuation.

To avoid these problems, it is proposed to use a discrete bit-type patterned medium in which recording dots are separated by a nonmagnetic material in advance so as to perform read and write using a single recording dot as one recording cell.

Also, in the magnetic recording medium incorporated into a hard disk drive (HDD), there is an increasing problem of disturbance of enhancement of track density due to interference between adjacent tracks. In particular, a serious technical subject is reduction of write blurring due to fringe effect of magnetic fields from a write head. To solve such a problem, for example, a discrete track recording-type patterned medium (DTR medium) has been proposed in which recording tracks are physically separated. The DTR medium is capable of reducing a side erase phenomenon of erasing information of an adjacent track in writing or a side read phenomenon of reading out information of an adjacent track in reading, and is capable of enhancing the track density. Therefore, the DTR medium is expected as a magnetic recording medium capable of providing a high recording density. It should be noted that the term "patterned medium" includes a discrete bit type patterned medium and a DTR medium, in a broader sense.

To read and write a DTR medium with a flying head, it is desired to flatten the surface of the DTR medium. Specifically, in order to process a perpendicular magnetic recording layer with a thickness of 20 nm into a patterned medium, grooves with a depth of 20 nm are formed. On the other hand, since the designed flying height of the flying head is about 10 nm, the head may contact the patterned medium when deep grooves are left behind. Accordingly, it has been attempted to fill the recesses between magnetic patterns with a nonmagnetic material so as to flatten the medium surface.

In order to fill recesses between magnetic patterns and flatten the surface, it has been known to deposit, for example, SiO or $SiO_2$ by RF sputtering (Jpn. Pat. Appln. KOKAI Publication No. 2006-236474).

However, since an oxygen-containing gas is used in the conventional method for RF sputtering of the nonmagnetic material, there is a problem the sidewalls of the magnetic patterns may be damaged by oxidation. In addition, process dusts may be produced or thickness dispersion of the nonmagnetic material may be caused by RF sputtering using the oxygen-containing gas.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIGS. 4A and 4B show the results of surface measurement of media with an atomic force microscope (AFM) after etch-back;

FIG. 5 shows the result of EDX analysis of compositional distribution in the nonmagnetic material after etch-back; and FIG. 6 is a cross-sectional view of the patterned medium having a nonmagnetic material with compositional distribution.

DETAILED DESCRIPTION

Various embodiments according to the invention will be described hereinafter with reference to the accompanying drawings. In general, according to one embodiment of the invention, there is provided a method of manufacturing a magnetic recording medium, comprising: forming protruded magnetic patterns on a substrate; depositing a nonmagnetic material in recesses between the magnetic patterns and on the magnetic patterns; and etching back the nonmagnetic material using an oxygen-containing etching gas while reforming a surface of the nonmagnetic material. According to another aspect of the present invention, there is provided a magnetic recording medium comprising: protruded magnetic patterns formed on a substrate; and a nonmagnetic material filled in recesses between the magnetic patterns, an oxygen concentration thereof being higher at a surface side than at a substrate side.

Figure 1:
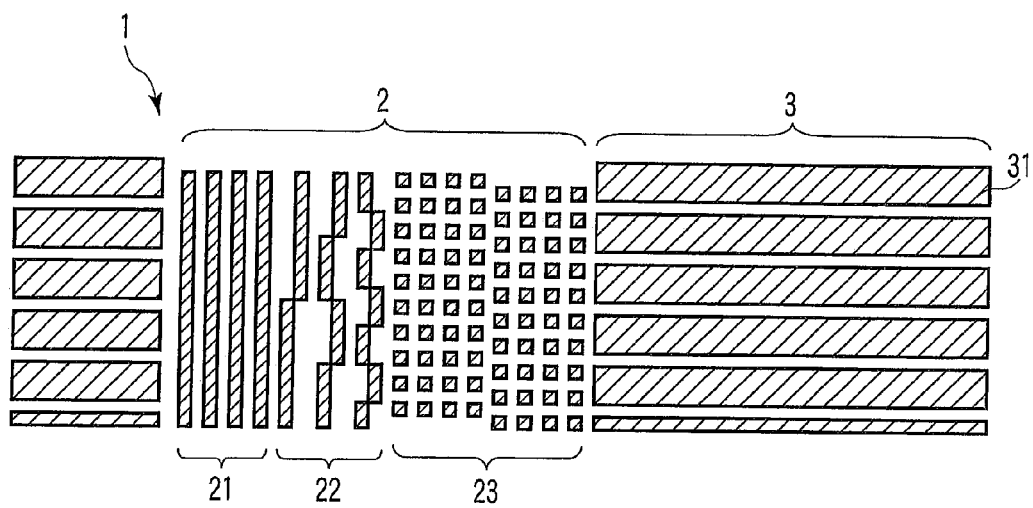
FIG. 1 is a plan view of a DTR medium according to an embodiment of the invention along the circumferential direction.

FIG. 1 shows a plan view of a patterned medium (DTR medium) according to an embodiment of the invention along the circumferential direction. As shown in FIG. 1, servo zones 2 and data zones 3 are alternately formed along the circumferential direction of the patterned medium 1. The servo zone 2 includes a preamble section 21, an address section 22 and a burst section 23. The data zone 3 includes discrete tracks 31.

Figure 2:
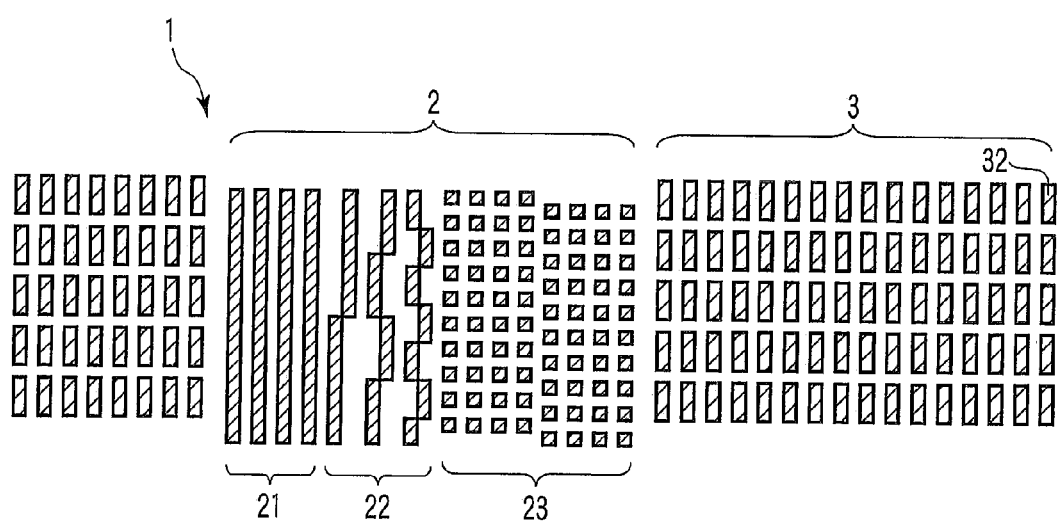
FIG. 2 is a plan view of a discrete bit-type patterned medium according to another embodiment of the invention along the circumferential direction.

FIG. 2 shows a plan view of a patterned medium (discrete bit-type patterned medium) according to another embodiment of the invention along the circumferential direction. Magnetic dots 32 are formed in the data zone 3 in this patterned medium.

A method of manufacturing a patterned medium according to an embodiment of the invention will be described with reference to FIGS. 3A to 3H.

Figure 3A:
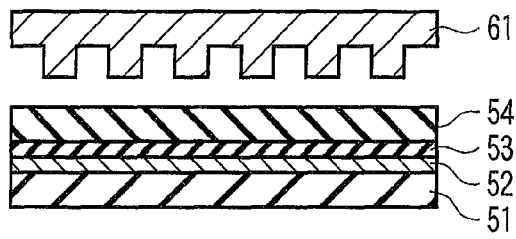
FIGS. 3A to 3H are cross-sectional views showing a method of manufacturing a patterned medium according to an embodiment of the invention.
Figure 3B:
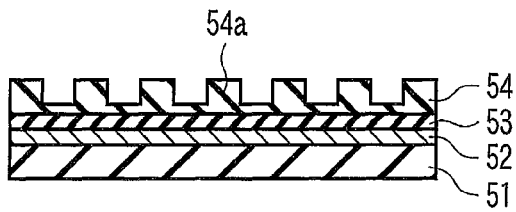
Figure 3C:
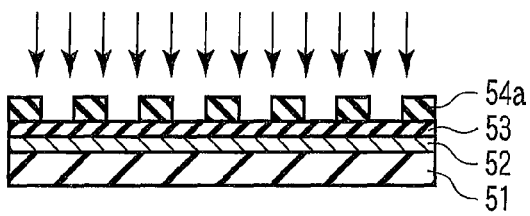
Figure 3D:
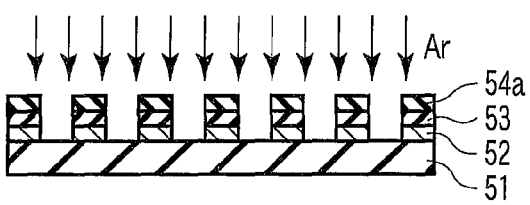
Figure 3E:

On a glass substrate 51, a soft magnetic underlayer made of CoZrNb with a thickness of 120 nm, an underlayer for controlling orientation made of Ru with a thickness of 20 nm, a ferromagnetic layer 52 made of CoCrPt—$SiO_2$ with a thickness of 20 nm and a protective layer 53 made of carbon (C) with a thickness of 4 nm are successively deposited. The soft magnetic underlayer and orientation control layer are not shown in the drawing for simplification. Spin-on-glass (SOG) with a thickness of 100 nm is spin-coated on the protective layer 53 as a resist 54. A stamper 61 is disposed so as to face the resist 54. Patterns of protrusions and recessed inverted to those of the magnetic patterns shown in FIG. 1 are formed on the stamper 61 (FIG. 3A).

Imprinting is performed by using the stamper 61 to form protrusions 54a of the resist 54 corresponding to the recesses in the stamper 61 (FIG. 2B).

Etching is performed with an ICP (inductively coupled plasma) etching apparatus to remove resist residues remaining on the bottoms of the recesses of the patterned resist 54. The conditions in the process are as follows: for instance, $CF_4$ is used as the process gas, the chamber pressure is set to 2 mTorr, the coil RF power and the platen RF power are set to 100 W, respectively, and the etching time is set to 30 seconds (FIG. 2C).

Using the resist patterns (SOG) left unremoved as etching masks, ion milling is performed with an ECR (electron cyclotron resonance) ion gun to etch the protective layer 53 with a thickness of 4 nm and the ferromagnetic layer 52 with a thickness of 20 nm (FIG. 2D). The conditions in the process are as follows: for instance, Ar is used as the process gas, the microwave power is set to 800 W, the acceleration voltage is set to 500V and the etching time is set to 3 minutes.

Then, the resist patterns (SOG) are stripped off with a RIE apparatus (FIG. 2E). The conditions in the process are as follows: for instance, $CF_4$ gas is used as the process gas, the chamber pressure is set to 100 mTorr, the coil power is set to 400 W and the platen power is set to 100 W.

Figure 3F:
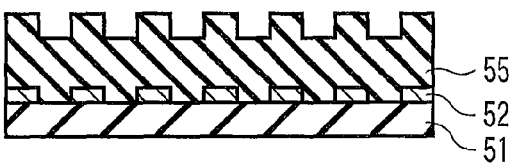

Then, a SiC—C target (composition ratio: SiC 20%, C 80%) is mounted on a sputtering apparatus, and a nonmagnetic material 55 is deposited in the recesses between the magnetic patters and on the magnetic pattern by DC sputtering (FIG. 3F). The conditions in the process are as follows: for instance, an Ar flow rate is set to 80 sccm and a deposition time is set to 260 seconds. DC sputtering of a non-oxide target in a process gas containing no oxygen prevents oxidative damage on the sidewalls of the magnetic patterns and suppresses process dusts.

Figure 3G:
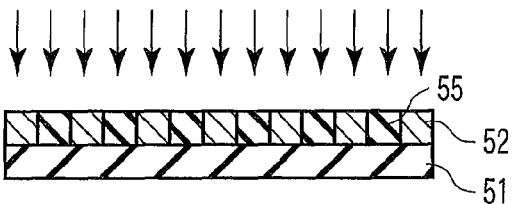

Subsequently, the nonmagnetic material 55 is etched back (FIG. 3G). The conditions in the process are as follows: for instance, an ECR ion gun is used, an Ar flow rate is set to 5 sccm and an $O_2$ flow rate is set to 5 sccm, which are used as process gases, a microwave power is set to 800 W, an acceleration voltage is set to 700V and an etching time is set to about 6 minutes.

In the present invention, deposition of the nonmagnetic material 55 shown in FIG. 3F and etch-back of the nonmagnetic material 55 shown in FIG. 3G may be repeated plural times.

Ar gas is used as the process gas in the etch-back process using the conventional ECR ion gun and ion-milling apparatus. On the contrary, an oxygen-containing gas, for example, a mixed gas of Ar and $O_2$ as described above, is used as the process gas in the present invention.

FIGS. 4A and 4B show the results of surface measurement of the media after the etch-back process with an atomic force microscope (AFM). An Ar—$O_2$ mixed gas is used in FIG. 4A, while Ar gas is used in FIG. 4B. As will be apparent from the comparison between FIGS. 4A and 4B, surface flatness at the same etch-back thickness is excellent in the case where the Ar—$O_2$ mixed gas is used over the case where Ar gas is used.

It is also found from the measurement with an optical surface analyzer (OSA) that thickness dispersion of the nonmagnetic material becomes smaller in the case where the Ar—$O_2$ mixed gas is used over the case where Ar gas is used.

The oxygen-containing gas may be used during the entire period of the time for applying etch-back, or may be used during a part of the time period. For example, when SiC—C with a thickness of 100 nm is deposited and then SiC—C is etched back by 100 nm, the oxygen-containing gas may be used only for the time period for etching back the first 10 nm, or the oxygen-containing gas may be used only for the time period for etching back the last 5 nm. Using the oxygen-containing gas at the initial stage of etch-back is advantageous in view of flatness. Using the oxygen-containing gas at the final stage of etch-back is advantageous in view of enhancement in shock-resistance of the medium since etching advances while the surface of the nonmagnetic material is reformed with $O_2$.

When deposition and etch-back of the nonmagnetic material are repeated plural times, the oxygen-containing gas may be used, for example, at a part of the etch-back time in one etch-back step of plural etch-back steps.

The oxygen concentration in the oxygen-containing gas is preferably from 1 vol % or more to 70 vol % or less, more preferably from 5 vol % or more to 70 vol % or less. If the oxygen concentration is less than 1 vol %, the surface reforming effect with oxygen is not exerted. The oxygen concentration exceeding 70 vol % is not preferable since DLC and the magnetic material existing on the medium surface are damaged. The gas pressure as a sum of Ar and $O_2$ is preferably from 0.01 to 1.0 Pa. The acceleration voltage for the beam is preferably in the range of 20 to 1,000V.

One time each of deposition and etch-back of the nonmagnetic material reduces the risk of dust generation since the process is simplified. Even when deposition and etch-back of the nonmagnetic material are repeated plural times, throughput may be improved by providing plural deposition chambers and etch-back chambers, since the process time per one chamber may be shortened. It is preferable to repeat deposition and etch-back of the nonmagnetic material until the depth of the recesses as measured with an atomic force microscope (AFM) becomes 4 nm or less in terms of flying characteristics of the head.

The end point of etch-back is judged at the time when Co contained in the ferromagnetic layer is detected using a quadrupole mass spectrometer (Q-MASS).

Figure 3H:
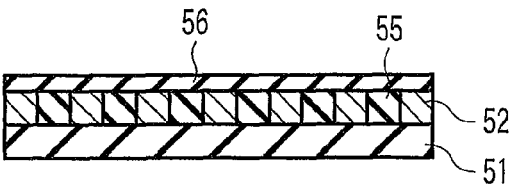

Finally, carbon (C) is deposited by chemical vapor deposition (CVD) to form the protective layer 56 (FIG. 3H). Further, a lubricant is applied to the protective layer 56 to provide a DTR medium.

Next, preferable materials to be used in the embodiments of the present invention will be described.

<Substrate>

As the substrate, for example, a glass substrate, Al-based alloy substrate, ceramic substrate, carbon substrate or Si single crystal substrate having an oxide surface may be used. As the glass substrate, amorphous glass or crystallized glass is used. Examples of the amorphous glass include common soda lime glass and aluminosilicate glass. Examples of the crystallized glass include lithium-based crystallized glass. Examples of the ceramic substrate include common aluminum oxide, aluminum nitride or a sintered body containing silicon nitride as a major component and fiber-reinforced materials of these materials. As the substrate, those having a NiP layer on the above metal substrates or nonmetal substrates formed by plating or sputtering may be used.

<Soft Magnetic Underlayer>

The soft magnetic underlayer (SUL) serves a part of such a function of a magnetic head as to pass a recording magnetic field from a single-pole head for magnetizing a perpendicular magnetic recording layer in a horizontal direction and to circulate the magnetic field to the side of the magnetic head, and applies a sharp and sufficient perpendicular magnetic field to the recording layer, thereby improving read/write efficiency. For the soft magnetic underlayer, a material containing Fe, Ni or Co may be used. Examples of such a material may include FeCo-based alloys such as FeCo and FeCoV, FeNi-based alloys such as FeNi, FeNiMo, FeNiCr and FeNiSi, FeAl-based alloys and FeSi-based alloys such as FeAl, FeAlSi, FeAlSiCr, FeAlSiTiRu and FeAlO, FeTa-based alloys such as FeTa, FeTaC and FeTaN and FeZr-based alloys such as FeZrN. Materials having a microcrystalline structure such as FeAlO, FeMgO, FeTaN and FeZrN containing Fe in an amount of 60 at % or more or a granular structure in which fine crystal grains are dispersed in a matrix may also be used. As other materials to be used for the soft magnetic underlayer, Co alloys containing Co and at least one of Zr, Hf, Nb, Ta, Ti and Y may also be used. Such a Co alloy preferably contains 80 at % or more of Co. In the case of such a Co alloy, an amorphous layer is easily formed when it is deposited by sputtering. Because the amorphous soft magnetic material is not provided with crystalline anisotropy, crystal defects and grain boundaries, it exhibits excellent soft magnetism and is capable of reducing medium noise. Preferable examples of the amorphous soft magnetic material may include CoZr-, CoZrNb- and CoZrTa-based alloys.

An underlayer may further be formed beneath the soft magnetic underlayer to improve the crystallinity of the soft magnetic underlayer or to improve the adhesion of the soft magnetic underlayer to the substrate. As the material of such an underlayer, Ti, Ta, W, Cr, Pt, alloys containing these metals or oxides or nitrides of these metals may be used. An intermediate layer made of a nonmagnetic material may be formed between the soft magnetic underlayer and the recording layer. The intermediate layer has two functions including the function to cut the exchange coupling interaction between the soft magnetic underlayer and the recording layer and the function to control the crystallinity of the recording layer. As the material for the intermediate layer Ru, Pt, Pd, W, Ti, Ta, Cr, Si, alloys containing these metals or oxides or nitrides of these metals may be used.

In order to prevent spike noise, the soft magnetic underlayer may be divided into plural layers and Ru layers with a thickness of 0.5 to 1.5 nm are interposed therebetween to attain anti-ferromagnetic coupling. Also, a soft magnetic layer may be exchange-coupled with a pinning layer of a hard magnetic film such as CoCrPt, SmCo or FePt having longitudinal anisotropy or an anti-ferromagnetic film such as IrMn and PtMn. A magnetic film (such as Co) and a nonmagnetic film (such as Pt) may be provided under and on the Ru layer to control exchange coupling force.

<Ferromagnetic Layer>

For the perpendicular magnetic recording layer, a material containing Co as a main component, at least Pt and further an oxide is preferably used. The perpendicular magnetic recording layer may contain Cr if needed. As the oxide, silicon oxide or titanium oxide is particularly preferable. The perpendicular magnetic recording layer preferably has a structure in which magnetic grains, i.e., crystal grains having magnetism, are dispersed in the layer. The magnetic grains preferably have a columnar structure which penetrates the perpendicular magnetic recording layer in the thickness direction. The formation of such a structure improves the orientation and crystallinity of the magnetic grains of the perpendicular magnetic recording layer, with the result that a signal-to-noise ratio (SN ratio) suitable to high-density recording can be provided. The amount of the oxide to be contained is important to provide such a structure.

The content of the oxide in the perpendicular magnetic recording layer is preferably 3 mol % or more and 12 mol % or less and more preferably 5 mol % or more and 10 mol % or less based on the total amount of Co, Cr and Pt. The reason why the content of the oxide in the perpendicular magnetic recording layer is preferably in the above range is that, when the perpendicular magnetic recording layer is formed, the oxide precipitates around the magnetic grains, and can separate fine magnetic grains. If the oxide content exceeds the above range, the oxide remains in the magnetic grains and damages the orientation and crystallinity of the magnetic grains. Moreover, the oxide precipitates on the upper and lower parts of the magnetic grains, with an undesirable result that the columnar structure, in which the magnetic grains penetrate the perpendicular magnetic recording layer in the thickness direction, is not formed. The oxide content less than the above range is undesirable because the fine magnetic grains are insufficiently separated, resulting in increased noise when information is reproduced, and therefore, a signal-to-noise ratio (SN ratio) suitable to high-density recording is not provided.

The content of Cr in the perpendicular magnetic recording layer is preferably 0 at % or more and 16 at % or less and more preferably 10 at % or more and 14 at % or less. The reason why the content of the Cr is preferably in the above range is that the uniaxial crystal magnetic anisotropic constant Ku of the magnetic grains is not too much reduced and high magnetization is retained, with the result that read/write characteristics suitable to high-density recording and sufficient thermal fluctuation characteristics are provided. The Cr content exceeding the above range is undesirable because Ku of the magnetic grains is lowered, and therefore, the thermal fluctuation characteristics are deteriorated, and also, the crystallinity and orientation of the magnetic grains are impaired, resulting in deterioration in read/write characteristics.

The content of Pt in the perpendicular magnetic recording layer is preferably 10 at % or more and 25 at % or less. The reason why the content of Pt is preferably in the above range is that the Ku value required for the perpendicular magnetic layer is provided, and further, the crystallinity and orientation of the magnetic grains are improved, with the result that the thermal fluctuation characteristics and read/write characteristics suitable to high-density recording are provided. The Pt content exceeding the above range is undesirable because a layer having an fcc structure is formed in the magnetic grains and there is a risk that the crystallinity and orientation are impaired. The Pt content less than the above range is undesirable because a Ku value satisfactory for the thermal fluctuation characteristics suitable to high-density recording is not provided.

The perpendicular magnetic recording layer may contain one or more types of elements selected from B, Ta, Mo, Cu, Nd, W, Nb, Sm, Tb, Ru and Re besides Co, Cr, Pt and the oxides. When the above elements are contained, formation of fine magnetic grains is promoted or the crystallinity and orientation can be improved and read/write characteristics and thermal fluctuation characteristics suitable to high-density recording can be provided. The total content of the above elements is preferably 8 at % or less. The content exceeding 8 at % is undesirable because phases other than the hcp phase are formed in the magnetic grains and the crystallinity and orientation of the magnetic grains are disturbed, with the result that read/write characteristics and thermal fluctuation characteristics suitable to high-density recording are not provided.

As the perpendicular magnetic recording layer, a CoPt-based alloy, CoCr-based alloy, CoPtCr-based alloy, CoPtO, CoPtCrO, CoPtSi, CoPtCrSi, a multilayer structure of an alloy layer containing at least one type selected from the group consisting of Pt, Pd, Rh and Ru and a Co layer, and materials obtained by adding Cr, B or O to these layers, for example, CoCr/PtCr, CoB/PdB and CoO/RhO may be used.

The thickness of the perpendicular magnetic recording layer is preferably 5 to 60 nm and more preferably 10 to 40 nm. When the thickness is in this range, a magnetic recording apparatus suitable to higher recording density can be manufactured. If the thickness of the perpendicular magnetic recording layer is less than 5 nm, read outputs are too low and noise components tend to be higher. If the thickness of the perpendicular magnetic recording layer exceeds 40 nm, read outputs are too high and the waveform tends to be distorted. The coercivity of the perpendicular magnetic recording layer is preferably 237000 A/m (3000 Oe) or more. If the coercivity is less than 237000 A/m (3000 Oe), thermal fluctuation resistance tends to be deteriorated. The perpendicular squareness of the perpendicular magnetic recording layer is preferably 0.8 or more. If the perpendicular squareness is less than 0.8, the thermal fluctuation resistance tends to be deteriorated.

<Protective Layer>

The protective layer is provided for the purpose of preventing corrosion of the perpendicular magnetic recording layer and also preventing the surface of a medium from being damaged when the magnetic head is brought into contact with the medium. Examples of the material of the protective layer include those containing C, $SiO_2$ or $ZrO_2$. The thickness of the protective layer is preferably 1 to 10 nm. This is preferable for high-density recording because the distance between the head and the medium can be reduced. Carbon may be classified into $sp^2$-bonded carbon (graphite) and $sp^3$-bonded carbon (diamond). Though $sp^3$-bonded carbon is superior in durability and corrosion resistance to graphite, it is inferior in surface smoothness to graphite because it is crystalline material. Usually, carbon is deposited by sputtering using a graphite target. In this method, amorphous carbon in which $sp^2$-bonded carbon and $sp^3$-bonded carbon are mixed is formed. Carbon in which the ratio of $sp^3$-bonded carbon is larger is called diamond-like carbon (DLC). DLC is superior in durability and corrosion resistance and also in surface smoothness because it is amorphous and therefore utilized as the surface protective layer for magnetic recording media. The deposition of DLC by CVD (chemical vapor deposition) produces DLC through excitation and decomposition of raw gas in plasma and chemical reactions, and therefore, DLC richer in $sp^3$-bonded carbon can be formed by adjusting the conditions.

Next, preferred manufacturing conditions in each process in the embodiments of the present invention will be described.

<Imprinting>

A resist is applied to the surface of a substrate by spin-coating and then, a stamper is pressed against the resist to thereby transfer the patterns of the stamper to the resist. As the resist, for example, a general novolak-type photoresist or spin-on-glass (SOG) may be used. The surface of the stamper on which patterns of protrusions and recesses corresponding to servo information and recording tracks are formed is made to face the resist on the substrate. In this process, the stamper, the substrate and a buffer layer are placed on the lower plate of a die set and are sandwiched between the lower plate and the upper plate of the die set to be pressed under a pressure of 2000 bar for 60 seconds, for example. The height of the protrusions of the patterns formed on the resist by imprinting is, for instance, 60 to 70 nm. The above conditions are kept for about 60 seconds for transporting the resist to be excluded. In this case, if a fluorine-containing peeling agent is applied to the stamper, the stamper can be peeled from the resist satisfactorily.

<Removal of Resist Residues>

Resist residues left unremoved on the bottoms of the recesses of the resist are removed by RIE (reactive ion etching). In this process, an appropriate process gas corresponding to the material of the resist is used. As the plasma source, ICP (inductively coupled plasma) apparatus capable of producing high-density plasma under a low pressure is preferable, but an ECR (electron cyclotron resonance) plasma or general parallel-plate RIE apparatus may be used.

<Etching of Ferromagnetic Layer>

After the resist residues are removed, the ferromagnetic layer is processed using the resist patterns as etching masks. For the processing of the ferromagnetic layer, etching using Ar ion beams (Ar ion milling) is preferable. The processing may be carried out by RIE using Cl gas or a mixture gas of CO and $NH_3$. In the case of RIE using the mixture gas of CO and $NH_3$, a hard mask made of Ti, Ta or W is used as an etching mask. When RIE is used, a taper is scarcely formed on the side walls of the protruded magnetic patterns. In processing the ferromagnetic layer by Ar ion milling capable of etching any material, if etching is carried out under the conditions that, for example, the acceleration voltage is set to 400V and incident angle of ions is varied between 30° and 70°, a taper is scarcely formed on the side walls of the protruded magnetic patterns. In milling using an ECR ion gun, if etching is carried out under static opposition arrangement (incident angle of ions is 90°), a taper is scarcely formed on the side walls of the protruded magnetic patterns.

<Stripping of Resist>

After the ferromagnetic layer is etched, the resist is stripped off. When a general photoresist is used as the resist, it can be easily stripped off by oxygen plasma treatment. Specifically, the photoresist is stripped off by using an oxygen ashing apparatus under the conditions that the chamber pressure is 1 Torr, power is 400 W and processing time is 5 minutes. When SOG is used as the resist, SOG is stripped off by RIE using fluorine-containing gas. As the fluorine-containing gas, $CF_4$ or $SF_6$ is suitable. Note that, it is preferable to carry out rinsing with water because the fluorine-containing gas reacts with moisture in the atmosphere to produce an acid such as HF and H$_2$SO$_4$. Redeposited products may be rinsed with exposure to H$_2$ plasma of H$_2$O plasma.

<Deposition of Nonmagnetic Material>

After stripping of the resist, a nonmagnetic material is deposited in the recesses between the magnetic patterns and on the magnetic patterns. In this step, the nonmagnetic material is deposited by bias sputtering or usual sputtering. The nonmagnetic material may be selected from Si, SiC, SiC—C, SiOC, SiON, Si$_3$N$_4$, Al, Al$_x$O$_y$, Ti, TiO$_x$ and a mixture thereof. The bias sputtering is a method in which the nonmagnetic material is deposited by sputtering while a bias is applied to the substrate and is capable of readily filling the recesses with the deposited nonmagnetic material. However, since the bias to the substrate is liable to damage the substrate as well as to produce sputtering dusts, usual sputtering may be favorably used. DC sputtering is more preferable than RF sputtering, although RF sputtering may be available, because the latter tends to cause thickness dispersion of the nonmagnetic material.

<Etch-Back of Nonmagnetic Material>

Etch-back of the nonmagnetic material is carried out until the ferromagnetic film (or the carbon protective film on the ferromagnetic film) is exposed. This etch-back process is preferably carried out by ion milling. When a silicon-based nonmagnetic material such as SiO$_2$ is used, the nonmagnetic material may be etched back by RIE using a fluorine-containing gas. Etching with an ECR ion gun is also available. When O$_2$ is added to the process gas as described above, etch-back can be performed while reforming the surface of the nonmagnetic material. To enhance planarization, etch-back is preferably performed in the perpendicular direction. In addition, deposition of nonmagnetic material and etch-back thereof may be repeated plural times.

<Deposition of Protective Layer and Aftertreatment>

After etch-back, a carbon protective layer is deposited. The carbon protective layer may be deposited by CVD, sputtering or vacuum evaporation. CVD produces a DLC film containing a large amount of sp$^3$-bonded carbon. A carbon protective layer with a thickness less than 2 nm is not preferable because it results in unsatisfactory coverage. A carbon protective layer with a thickness exceeding 10 nm is not preferable because it increases magnetic spacing between a read/write head and a medium, leading to deterioration in SNR. A lubricant is applied to the surface of the protective layer. As the lubricant, for example, perfluoropolyether, fluorinated alcohol, fluorinated carboxylic acid or the like is used.

EXAMPLES

Example 1

Using a stamper having patterns of protrusions and recesses of servo patterns (preamble, address, and burst) and recording tracks formed thereon as shown in FIG. 1, a DTR medium was manufactured in the method shown in FIGS. 3A to 3H. In the step of FIG. 3F, a nonmagnetic material was deposited by DC sputtering using a SiC—C target. Specifically, the Ar flow rate was set to 80 sccm and the deposition time was set to 260 seconds, and a SiC—C film with a thickness of 100 nm was deposited. An analysis of the surface of the nonmagnetic material by secondary ion mass spectrometry (SIMS) showed that Si content was 7.47 at %, O content was 5.51 at % and C content was 87.1 at %. In the step of FIG. 3G, the nonmagnetic material was etched back with an ECR ion gun. The nonmagnetic material was etched back using a mixed gas of Ar and O$_2$ at a microwave power of 800 W and an acceleration voltage of 700V for about 12 minutes. FIG. 5 shows the results of EDX analysis for compositional distribution in the nonmagnetic material after the etch-back process. As shown in the drawing, it was confirmed that the concentration of O decreased while the concentration of C increased from the surface toward the substrate.

FIG. 6 shows a cross-sectional view of a patterned medium having the nonmagnetic material with compositional distribution. A soft magnetic layer 72 is formed on a substrate 71, and protruded patterns of ferromagnetic layer 73 and protective layer 74 made of carbon are formed on the soft magnetic layer 72. The nonmagnetic material is filled in the recesses between the protruded patterns of the ferromagnetic layer 73. This nonmagnetic material includes a substrate-side nonmagnetic material (SiC—C) 75a and a surface-side nonmagnetic material (SiOC) 75b.

A measurement of the land/groove ratio in the track region by MFM showed that the ratio was 2:1 that is approximately equal to the ratio before filling with the nonmagnetic material. As a result of acoustic emission (AE) measurement using a glide head, no AE signal was observed.

Comparative Example 1

A patterned medium was manufactured by the conventional method using the same stamper as in Example 1. In the step of FIG. 3F, RF sputtering using a SiO target was performed at an Ar flow rate of 75 sccm and an O$_2$ flow rate of 5 sccm, and a SiO$_2$ film with a thickness of 100 nm was deposited by setting the sputtering time to 500 seconds. The result of SIMS analysis showed that the film was composed of SiO$_2$ (36.0 at %) and O (64.0 at %). In the step of FIG. 3G, the nonmagnetic material was etched back with an ECR ion gun. The etch-back conditions were as follows: Ar was used as a process gas, a microwave power was set to 800 W and an acceleration voltage was set to 700V, and etch-back is performed for about 15 minutes.

A measurement of the land/groove ratio in the track region by MFM showed that the width of the land (ferromagnetic layer portion) was decreased from that before filled with the nonmagnetic material, and the ratio was about 1:1. It was found that the land/groove ratio was varied due to process damage. As a result of acoustic emission (AE) measurement using a glide head, AE signals were observed. This seems to be due to a large quantity of process dusts produced in RF sputtering.

The above results show that the method of Example 1 gives less damage to the ferromagnetic layer as compared with the method of Comparative Example 1, and a medium having good surface flatness (i.e., no AE signal is observed) may be manufactured by the method of Example 1.

Example 2

Using a stamper having patterns of protrusions and recesses of servo patterns (preamble, address, and burst) and recording tracks formed thereon as shown in FIG. 1, a DTR medium was manufactured in the method shown in FIGS. 3A to 3H. In the step shown of FIG. 3F, a nonmagnetic material was deposited by DC sputtering using a SiC—C target. Specifically, the Ar flow rate was set to 80 sccm and the deposition time was set to 260 seconds, and a SiC—C film with a thickness of 100 nm was deposited. In the step of FIG. 3G, the nonmagnetic material was etched back with an ECR ion gun. The nonmagnetic material was etched back using a mixed gas of Ar and O$_2$ at a microwave power of 800 W and an acceleration voltage of 700V for about 12 minutes.

The thickness distribution of the filled nonmagnetic material was measured using NANOSPEC (trade name; manufactured by Nanometrics). As a result, almost no thickness distribution was observed in the medium, in which the difference of thickness between the thickest portion and thinnest portion was 1% of the thickness.

Comparative Example 2

A patterned medium was manufactured by the conventional method using the same stamper as in Example 1. In the step of FIG. 3F, RF sputtering using a SiO target was performed at an Ar flow rate of 75 sccm and an $O_2$ flow rate of 5 sccm, and a $SiO_2$ film with a thickness of 100 nm was deposited by setting the sputtering time to 500 seconds. The result of SIMS analysis showed that the film was composed of $SiO_2$ (36.0 at %) and O (64.0 at %). In the step of FIG. 3G, the nonmagnetic material was etched back with an ECR ion gun. The etch-back conditions were as follows: Ar was used as a process gas, a microwave power was set to 800 W and an acceleration voltage was set to 700V, and etch-back is performed for about 15 minutes.

The thickness distribution of the filled nonmagnetic material was measured using NANOSPEC (trade name; manufactured by Nanometrics). As a result, thickness distribution of the nonmagnetic material was observed between the upper and lower portions of the medium, in which difference in the thickness was 10% at maximum.

Comparison between Example 2 and Comparative Example 2 shows the followings. When the nonmagnetic material is deposited by RF sputtering using an oxygen-containing gas as in Comparative Example 2, about 10% of thickness dispersion may be caused. This corresponds to difference in level of 10 nm for the nonmagnetic material with a thickness of 100 nm. It is not preferable that the nonmagnetic material with a thickness of 4 nm or more remains on the ferromagnetic layer in terms of magnetic spacing. On the contrary, a medium with small thickness distribution can be manufactured in Example 2.

Example 3

A DTR medium was manufactured by a similar method to that in Example 1, except that steps of depositing SiC—C with a thickness of 100 nm and etching-back SiC—C were repeated 5 times. The cross-sectional of the DTR medium was observed with TEM. It was confirmed from the light and shade of the TEM image that the nonmagnetic material filled in the recesses is comprised of five layers. The compositional distribution of one layer of the nonmagnetic material was the same as in Example 1.

Since observation of a stacked structure of the nonmagnetic material was impossible in some medium, the composition was evaluated by SIMS. As shown in FIG. 5, decrease in O concentration and increase in C concentration from the surface side toward the substrate side were observed.

Touchdown and takeoff test was carried out for the medium. A difference in pressure ΔP between touchdown and takeoff was 0.18 atm. After the test, the surface of the medium was observed for bright spots due to fine dusts. As a result, no significant change was observed.

Comparative Example 3

A patterned medium was manufactured by the conventional method using the same stamper as in Example 1. In the step of FIG. 3F, RF sputtering using a SiO target was performed at an Ar flow rate of 75 sccm and an $O_2$ flow rate of 5 sccm, and a $SiO_2$ film with a thickness of 100 nm was deposited by setting the sputtering time to 500 seconds. The result of SIMS analysis showed that the film was composed of $SiO_2$ (36.0 at %) and O (64.0 at %). In the step of FIG. 3G, the nonmagnetic material was etched back with an ECR ion gun. The etch-back conditions were as follows: Ar was used as a process gas, a microwave power was set to 800 W and an acceleration voltage was set to 700V, and etch-back is performed for about 15 minutes. The sectional TEM observation revealed that the recesses were filled with $SiO_2$ having uniform composition.

Touchdown and takeoff test was carried out for the medium. A difference in pressure ΔP between touchdown and takeoff was 0.05 atm. After the test, the surface of the medium was observed for bright spots due to fine dusts. As a result, a large number of bright spots were produced. When the cross-section of the medium was observed with SEM, it was shown that cracks were produced at portions where the head contacted.

Comparison between Example 3 and Comparative Example 3 shows the followings. When the nonmagnetic material used is $SiO_x$ having high hardness as in Comparative Example 3, cracks are likely to be produced by application of impact, leading to dust generation. On the contrary, in Example 3, since the nonmagnetic material filled in the recesses has a multilayered structure or composition distribution in which difference in density of the material is produced between the layers, impact applied to the medium seems to be absorbed by the nonmagnetic material.

Example 4

A DTR medium was manufactured by the same method as in Example 1, except that different kinds of nonmagnetic materials were used. The nonmagnetic materials used were Si, SiC, SiOC, SiON, $Si_3N_4$, Al, $Al_xO_y$, Ti and $TiO_x$. These nonmagnetic materials were deposited by bias sputtering or DC sputtering. It was confirmed that no AE signal was observed in any of the DTR media.

Comparative Example 4

A DTR medium was manufactured by the same method as in Example, except that Cu was used as the nonmagnetic material. AE signals were observed in this DTR medium. This is because Cu was heated and reflowed during the steps of sputtering and etch-back and the surface morphology of the medium was impaired.

A DTR medium was manufactured by the same method as in Example 1, except that carbon (C) was used as the nonmagnetic material. AE signals were also observed in this DTR medium. This is because the surface roughness Ra was increased due to reaction between carbon and oxygen.

Example 5

A nonmagnetic material with a thickness of 100 nm was deposited by RF sputtering using SiC as a target at an Ar flow rate of 75 sccm and an $O_2$ flow rate of 5 sccm (mixing ratio of oxygen: 6.3%). The nonmagnetic material was etched back with an ECR ion gun from the perpendicular direction using a mixed gas of Ar and $O_2$ as a process gas at a microwave power of 800 W and an acceleration voltage of 700V for about 12 minutes. The maximum depth of the recesses on the surface of the DTR medium was 4 nm.

Comparative Example 5

A DTR medium was manufactured by the same method as in Example 5, except that the nonmagnetic material was etched back by 100 nm at an angle of 40° with an Ar ion milling apparatus. The maximum depth of the recesses on the surface of the DTR medium was 15 nm.

The results in Example 5 and Comparative Example 5 show that etch-back from perpendicular direction using an ion gun is effective for surface flatness.

Example 6

Using a stamper having patterns of protrusions and recesses of servo patterns (preamble, address, and burst) and magnetic dots formed thereon as shown in FIG. 2, a discrete bit-type patterned medium was manufactured in the method shown in FIGS. 3A to 3H. The magnetic dots have a rectangular shape of 120 nm in the cross-track direction and 25 nm in a down-track direction. This medium has a recording density corresponding to 130 Gbpsi. In the step of FIG. 3F, a nonmagnetic material was deposited by DC sputtering using a SiC—C target. Specifically, the Ar flow rate was set to 80 sccm and the deposition time was set to 260 seconds, and a SiC—C film with a thickness of 100 nm was deposited. In the step of FIG. 3G, the nonmagnetic material was etched back with an ECR ion gun. The nonmagnetic material was etched back using a mixed gas of Ar and $O_2$ at a microwave power of 800 W and an acceleration voltage of 700V for about 12 minutes.

As a result of acoustic emission (AE) measurement using a glide head, no AE signal was observed. As a result of AES depth profile measurement, no oxide layer was detected.

The same effects as in the DTR media in Examples 1 to 5 may be also expected in the discrete bit-type patterned medium.

As hitherto described, by using processes of depositing a nonmagnetic material and then etching-back the nonmagnetic material using an oxygen-containing gas, the present invention can provide a patterned medium having good surface flatness with small thickness dispersion and high impact resistance.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method of manufacturing a magnetic recording medium, comprising:
    forming protruded magnetic patterns on a substrate;
    depositing a nonmagnetic material in recesses between the magnetic patterns and on the magnetic patterns, the nonmagnetic material being at least one selected from the group consisting of SiC, SiC—C, SiOC, SiON, $Si_3N_4$ and Al; and
    etching back the nonmagnetic material using an etching gas of Ar—$O_2$ mixed gas having an oxygen concentration in a range of 1% or more and 70% or less while reforming a surface of the nonmagnetic material;
    wherein deposition of the nonmagnetic material and etch-back of the nonmagnetic material are repeated multiple times to form a multi-layered nonmagnetic material in the recesses between the magnetic patterns.

2. The method of claim 1, wherein the oxygen-containing etching gas of Ar—$O_2$ mixed gas is used in an entire or a part of an etch-back time.

* * * * *